US009145270B2

(12) United States Patent
Touitou et al.

(10) Patent No.: US 9,145,270 B2
(45) Date of Patent: Sep. 29, 2015

(54) APPARATUS FOR HANDLING AND ACCUMULATING ARTICLES IN A BUFFER AREA

(75) Inventors: Haim Touitou, Octeville sur Mer (FR); Dorian Steeber, Fort Gibson, OK (US)

(73) Assignee: GEBO PACKAGING SOLUTIONS FRANCE, Reichstett (FR)

( * ) Notice: Subject to any disclaimer, the term of this patent is extended or adjusted under 35 U.S.C. 154(b) by 470 days.

(21) Appl. No.: 13/382,729

(22) PCT Filed: Jul. 6, 2009
(Under 37 CFR 1.47)

(86) PCT No.: PCT/IB2009/006836
§ 371 (c)(1),
(2), (4) Date: Oct. 23, 2012

(87) PCT Pub. No.: WO2011/004213
PCT Pub. Date: Jan. 13, 2011

(65) Prior Publication Data
US 2013/0062165 A1    Mar. 14, 2013

(51) Int. Cl.
*B65G 37/00* (2006.01)
*B65G 47/00* (2006.01)
*B65G 47/52* (2006.01)
*B65G 47/51* (2006.01)

(52) U.S. Cl.
CPC ................................. *B65G 47/5131* (2013.01)

(58) Field of Classification Search
None
See application file for complete search history.

(56) References Cited

U.S. PATENT DOCUMENTS

| 4,054,202 | A | * | 10/1977 | Hautemont | ................... | 198/805 |
| 6,152,291 | A | | 11/2000 | Steeber et al. | | |
| 6,591,963 | B2 | | 7/2003 | Wipf | | |
| 6,698,581 | B2 | | 3/2004 | Steeber et al. | | |
| 7,222,723 | B2 | * | 5/2007 | Horton et al. | ................. | 198/594 |

FOREIGN PATENT DOCUMENTS

FR    1 120 601 A    7/1956
WO    WO 2008/026478 A1    3/2008

* cited by examiner

*Primary Examiner* — Kavel Singh
(74) *Attorney, Agent, or Firm* — Sughrue Mion, PLLC

(57) ABSTRACT

Apparatus (1) for handling articles (2), including an endless infeed drive member (3) moving in an infeed direction (ID); an endless outfeed drive member (4) moving in a second, outfeed direction (OD); and an endless carrier conveyor (33) having. The carrier conveyor includes an infeed section (34) overlying the infeed drive member (3), whereby the infeed drive member (3) drives the infeed section (34) in the infeed direction (ID); an outfeed section (35) overlying the outfeed drive member (4), whereby the outfeed drive member (4) drives the outfeed section (35) in the outfeed direction (OD); and an arcuate intermediate section (36) bridging the infeed section (34) and the outfeed section (35) along a transfer path (37) between a diverting point (DIV) where the carrier conveyor (33) disconnects from the infeed drive member (3), and an inverting point (INV) where the carrier conveyor (33) connects the outfeed drive member (4).

14 Claims, 5 Drawing Sheets

APPARATUS FOR HANDLING AND ACCUMULATING ARTICLES IN A BUFFER AREA

CROSS REFERENCE TO RELATED APPLICATIONS

This application is a National Stage of International Application No. PCT/JP2009/006836 filed Jul. 6, 2009, the contents of all of which are incorporated herein by reference in their entirety.

FIELD OF THE INVENTION

The invention relates to the field of article handling. More precisely, it relates to an apparatus for conveying and transferring articles from an infeed section to an outfeed section in a first in first out (FIFO) sequence.

BACKGROUND OF THE INVENTION

Apparatuses which permit the control of a flow of articles are useful wherever there is a need for accumulating articles in a buffer area between an upstream delivery station (e.g. a container filling and capping unit) and a downstream receiving station (e.g. a container labeling and/or wrap around station) in the event of a speed rate differential between the stations, e.g. when the downstream station is either shut down or running at an insufficient speed, whereby the articles fed from the upstream delivery station can not be properly handled.

Such apparatuses, which provide the ability to set the amount of articles temporarily stored in the buffer area, are commonly referred to as "accumulators". Depending upon the room available and the configuration of the manufacturing plant, the accumulator may be of planar/straight or spiral/helical form.

U.S. Pat. No. 6,591,963 to Wipf discloses a straight storage apparatus comprising a carriage which can be displaced along a conveying plane. A pair of deflecting rollers is arranged on the carriage to guide an endless conveying means. One of the deflecting rollers subdivides a storage strand of the apparatus in an entry-side storage strand and an exit-side storage strand. The length of the storage strand can be changed, as does the capacity of the storage apparatus.

In theory, such a solution seems satisfactory because its construction appears quite simple. In practise however, drawbacks come to light when the setting of the apparatus must be achieved and in particular when the conveyor has to be tensioned. As disclosed in U.S. Pat. No. 6,591,963, tensioning means are provided on the carriage, the deflecting rollers being mounted in a mutually resilient manner. Although the tensioning process is not specifically disclosed in the Wipf patent, the skilled person can understand that the tensioning is achieved by moving the rollers towards each other, thereby exerting a traction effort on the circular portions of the conveying means wrapped around the deflecting rollers. The reaction effort exerted on the deflecting rollers by the conveying means generate undesired though inevitable bending and shear stresses on the axis of rotation of the rollers, thereby increasing the risk of axis wear, fatigue and, possibly, rupture.

U.S. Pat. No. 6,152,291 to Steeber et al, assigned to Hartness, discloses a spiral accumulator having an infeed conveyor driven in a first direction, and an outfeed conveyor spaced apart from the infeed conveyor and driven in an opposite direction. A transport member carrying a rotatable wheel is provided between the infeed and outfeed conveyors. The rotatable wheel is engaged on both sides by the infeed and outfeed conveyors so that the wheel is caused to rotate and the transport member may be caused to move along a path parallel to the infeed and outfeed conveyors depending upon the relative speed thereof. An article transfer member is also carried by the transport member for deflecting articles from the infeed conveyor to the outfeed conveyor. Articles deflected from the infeed conveyor temporarily run on a dead plate provided around the wheel over the space between the conveyors.

The Hartness accumulator does not have the hereabove mentioned drawback of Wifp's apparatus, since the stresses resulting from the tensioning of the infeed and outfeed conveyors are not transmitted to the rotatable wheel.

However, operating the Hartness accumulator has revealed uncontrolled movements of the articles in the turnaround area above the wheel, and more specifically at the junction of the (moving) infeed conveyor and the (still) dead plate, where the conveyor tends to move the articles ahead, whereas the dead plate is forcing them to loose headway. In addition, tacky articles may stick to the (still) surface of the transfer member. Subsequent uncontrolled movements of the articles may result in article jam and failure of the whole accumulating process, thereby causing the accumulator to be stopped, along with the entire upstream part of the manufacturing plant.

In order to improve article transfer, it was later on proposed to equip the article transfer member with an endless drive belt that is disposed along the transfer path so as to contact and move articles therealong, see U.S. Pat. No. 6,698,581 to Steeber et al, assigned to Hartness.

This solution seems satisfactory prima facie, but movement of the endless drive belt has to be synchronized with the infeed and outfeed conveyors. In order to achieve such synchronization, there is provided a complex and heavy transmission mechanism including a toothed wheel engaging the infeed and outfeed conveyors.

SUMMARY OF THE INVENTION

It is an object of the invention to provide a solution to the hereabove mentioned drawbacks.

More specifically, it is an object of the invention to improve reliability of article transfer between an upstream delivery station and a downstream receiving station, e.g. in an article accumulator located in a buffer area.

Yet it is another object of the invention to facilitate movement of articles in a turnaround area between an infeed section and an outfeed section moving in opposite directions, in order to reduce the risks of article jam and increase machine speed rate and overall performance.

In accordance with the objects and purposes of the invention, there is provided an apparatus for handling articles, including:

An endless infeed drive member moving in an infeed direction;

An endless outfeed drive member spaced apart from the infeed drive member and moving in a second, outfeed direction opposite to the infeed direction;

An endless carrier conveyor having:

An infeed section overlying the infeed drive member and removably attached thereto, whereby said infeed drive member drives said infeed section in the infeed direction;

An outfeed section overlying the outfeed drive member and removably attached thereto, whereby said outfeed drive member drives said outfeed section in the outfeed direction;

An arcuate intermediate section bridging the infeed section and the outfeed section along a transfer path between a diverting point where the carrier conveyor disconnects from the infeed drive member, and an inverting point where the carrier conveyor connects the outfeed drive member.

In such an apparatus, the drive function and the support and conveying function are separated. The drive function is achieved through the underlying drive members, whereas the article support and conveying function is achieved through the carrier conveyor. Accordingly, there is no need for applying a great tension on the carrier conveyor, which remains passive. As a result, in normal operation no damaging stress is exerted by the carrier conveyor on the parts of the apparatus with which it is in contact.

The endless infeed drive member, the endless outfeed drive member and the endless carrier conveyor are e.g. endless chain belts, each including a plurality of connecting links.

In a preferred embodiment, the endless carrier conveyor is magnetically attached to the infeed drive member and to the outfeed drive member.

For example, each connecting link of the infeed and outfeed drive members comprises a supporting plate made of a ferromagnetic metal, whereas each connecting link of the endless carrier conveyor comprises a permanent magnet which, in the infeed section, is magnetically attached to the supporting plate of a connecting link of the infeed drive member and which, in the outfeed section, is magnetically attached to the supporting plate of a connecting link of the outfeed drive member.

In a preferred embodiment, the apparatus further comprises a carriage comprising a transfer wheel pivotally mounted between the infeed and outfeed drive members and drivingly engaged on its circumference by the endless carrier conveyor which causes the transfer wheel to rotate around a central axis, whereby said carriage remains still as long as there is no speed difference between the drive members moving in opposite directions, whereas as soon as there exists a speed difference the carriage travels in the direction of the faster drive member. The arcuate intermediate section of the endless carrier conveyor is tangent to and frictionally engages the transfer wheel.

The carriage may further comprise a dead plate mounted adjacent to the transfer wheel and extending between the infeed and outfeed drive members, whereby the endless carrier conveyor rides on the dead plate in the intermediate section.

In a preferred embodiment, the carriage further includes an arcuate guide member extending outwardly along and adjacent the intermediate section of the endless carrier conveyor.

In addition, the apparatus may also comprise:
an infeed drive mechanism for displacing each drive member, said infeed drive mechanism comprising a drive sprocket engaging the drive member and a variable speed drive motor pivotally coupled to the drive sprocket, and
a driven pulley engaged by the endless carrier conveyor, mounted parallel and adjacent to the drive sprocket.

The above and other objects and advantages of the invention will become apparent from the detailed description of preferred embodiments, considered in conjunction with the accompanying drawings.

DESCRIPTION OF PREFERRED EMBODIMENTS

Figure 1:
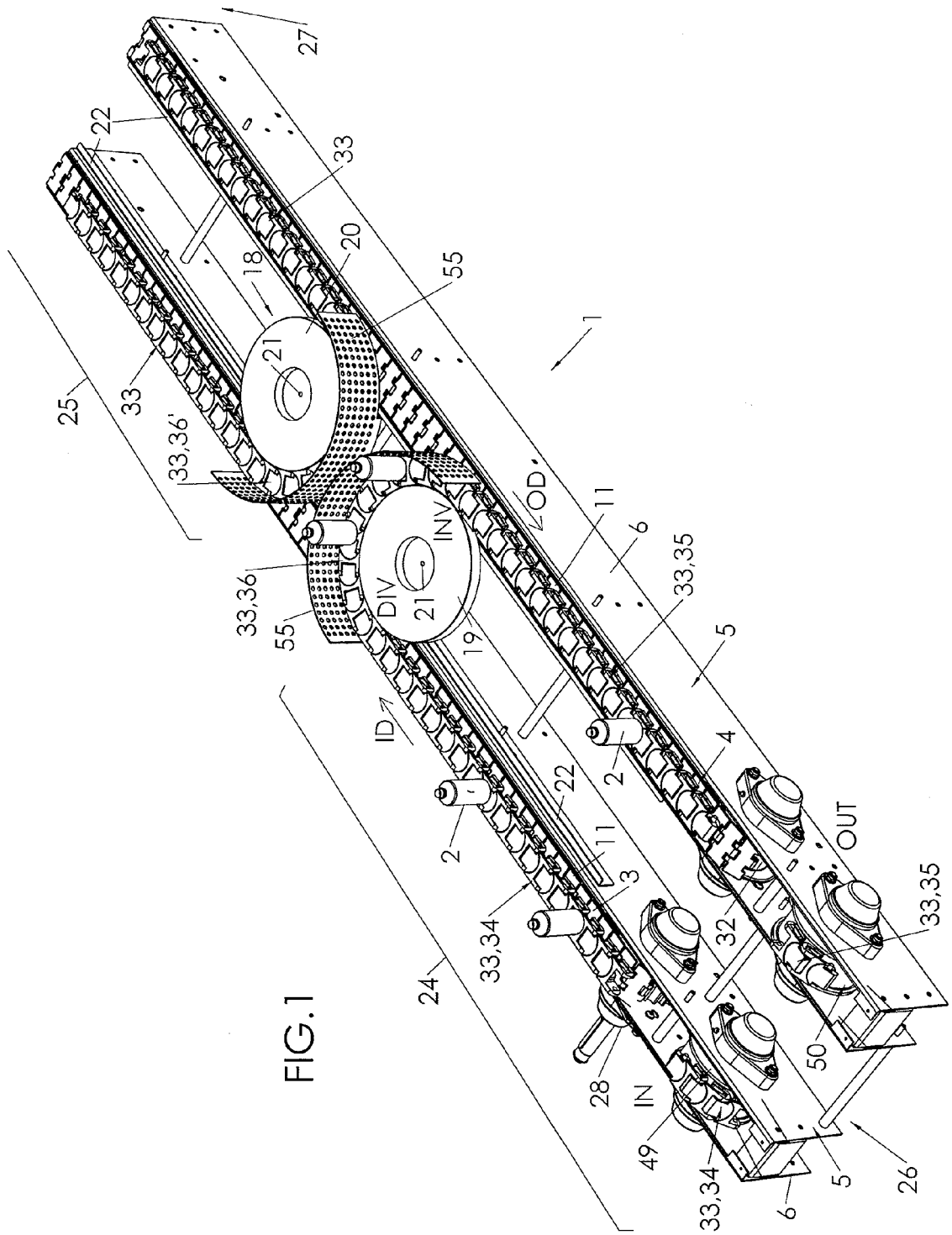
FIG. 1 is a front perspective view of an embodiment of the apparatus of the present invention, for handling and accumulating containers in a buffer area between an upstream delivery station and a downstream receiving station.

Turning now to the drawings, and more specifically to FIG. 1, there is shown an embodiment of an apparatus 1 for handling and accumulating articles 2 (e.g. containers) in a buffer area between an upstream delivery station and a downstream receiving station.

The apparatus 1 comprises an endless infeed drive member 3 and an endless outfeed drive member 4 parallel to and spaced apart from the infeed drive member 3. The endless infeed drive member 3 moves in an infeed direction ID, whereas the endless outfeed drive member 4 moves in an outfeed direction OD opposite to the infeed direction ID.

In FIG. 1 only part of the apparatus 1 is represented. It can be seen on the right of the drawing that the drive members 3, 4 are cut, but the skilled person may easily imagine that in practise they may run much longer, depending upon the size of the buffer area needed. In addition, although the section of the apparatus 1 illustrated in FIG. 1 is straight, it shall be understood that any shape (arcuate, looped, helical, etc.) may be suitable as well, depending upon the configuration of the available space surrounding the apparatus 1.

Figure 4:
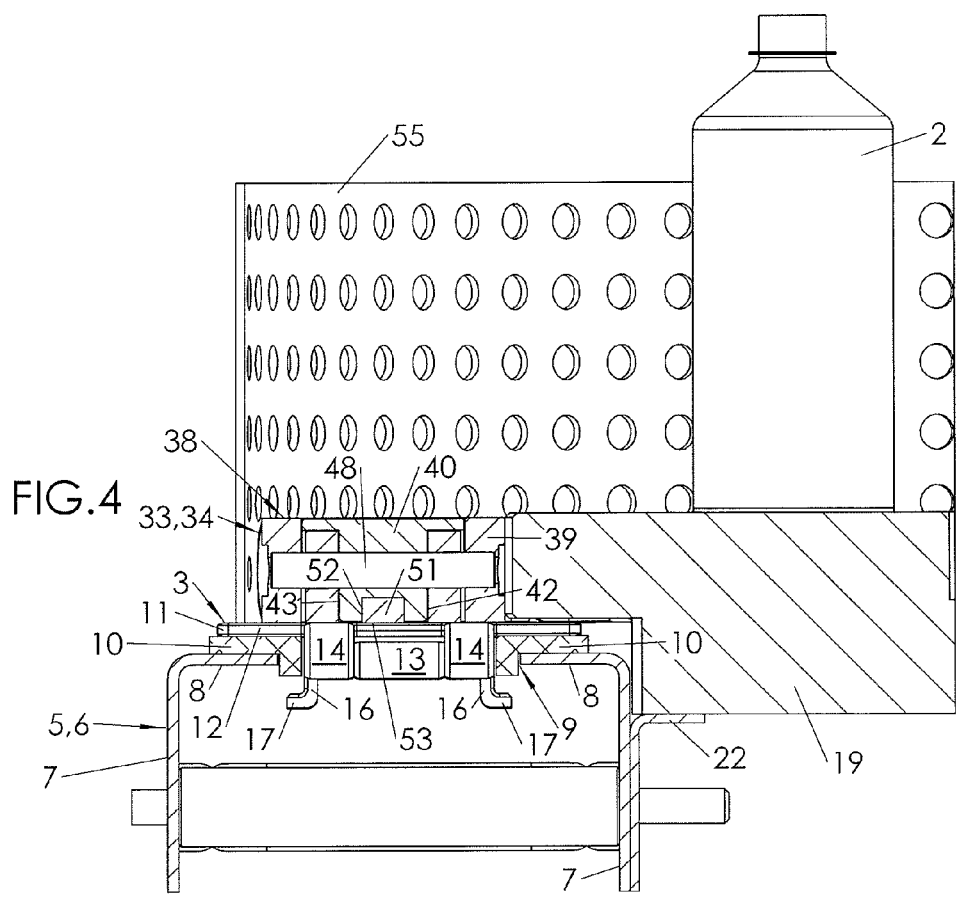
FIG. 4 is a cross sectional view showing a detail of the apparatus of FIG. 1, taken along the line IV-IV on FIG. 3. The drawing shows the infeed drive member and the endless conveyor at a diverting point where the endless conveyor disconnects from the drive member and frictionally engages the transfer wheel.
Figure 5:
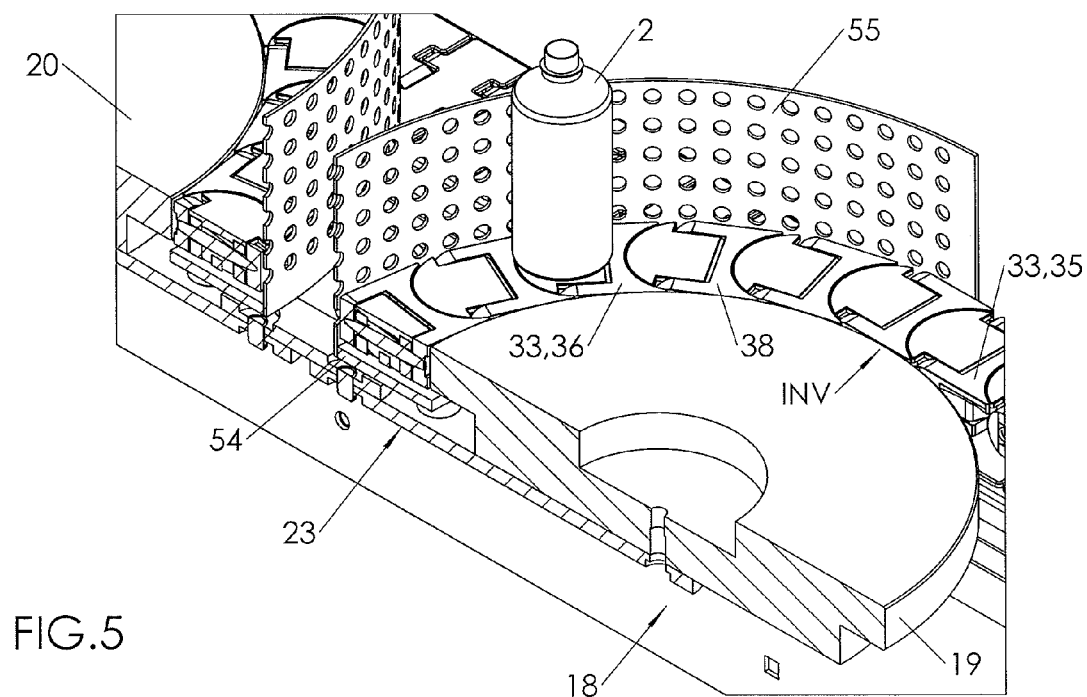
FIG. 5 is a perspective sectional view showing a detail of the apparatus of FIG. 1, taken along the line V-V of FIG. 3. The drawing shows the endless conveyor in a transfer path around the transfer wheel.
Figure 6:
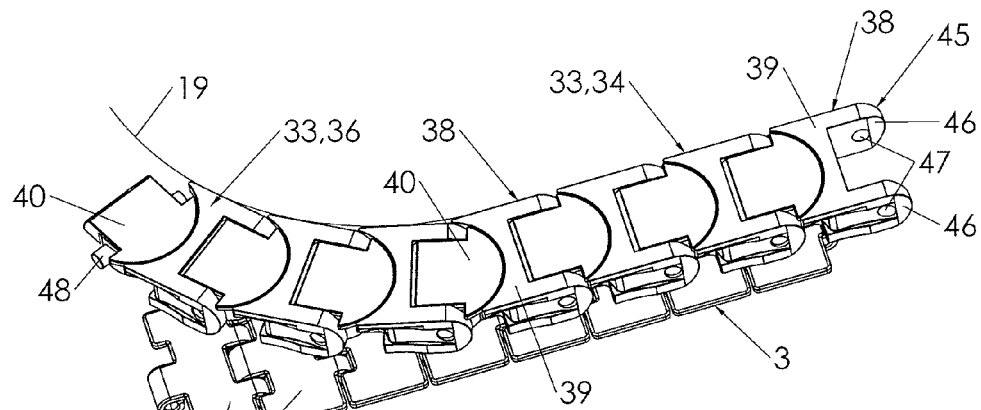
FIG. 6 is a top perspective view showing a detail of the apparatus of FIG. 1. The drawing shows the infeed drive member and the endless conveyor at the diverting point. The transfer wheel is schematically represented by an arcuate line.

Each drive member 3, 4 rests on and runs along a respective support frame 5 comprising a pair of spaced apart and parallel walls 6 each including a vertical section 7 and a horizontal support section 8. The support sections 8 are spaced apart and together define a longitudinal groove 9 forming a guiding track for the respective drive member 3, 4. In a preferred embodiment illustrated on FIG. 4, a pair of guiding pads 10 is mounted on the support sections 8. Each guiding pad 10 is made of a low-friction material, such as nylon or PTFE.

In the illustrated preferred embodiment, each drive member 3, 4 is an endless chain belt including a plurality of connecting links 11. Each connecting link 11 is made of a ferromagnetic metal such as a ferritic stainless steel and comprises a planar supporting plate 12 and, integrally formed therewith, a male connecting part 13 and an opposite female connecting part 14 receiving a male connecting part 13 of an adjacent link 11. Attachment of two links 11 is achieved by means of a connecting pin 15 inserted both in the male and female connecting parts 13, 14, whereby the links 11 are hingedly attached to one another around the connecting pin 15.

Each link 11 also comprises a pair of guiding tabs 16 integrally formed with the supporting plate 12 and downwardly protruding therefrom. As depicted on FIG. 4, each link 11 rests on the horizontal support section 8, whereby the supporting plate 12 lays on the guiding pads 10 with the guiding tabs 16 received therebetween. At a lower end, each tab 16 is hooked and comprises a lateral protrusion 17 to prevent vertical tear-out of the link 11 from the guiding track 9.

Arranged between the support frames 5 is a movable carriage 18 including a pair of spaced apart wheels 19, 20 each pivotally mounted between the infeed and outfeed drive members 3, 4 around a central axis 21. The wheels 19, 20 rest on a pair of rails 22 longitudinally fixed to inner walls 6 of the support frames 5.

The wheels 19, 20 are connected to each other by means of a connecting rod 23 hingedly mounted between both axis 21, so that the movable carriage 18 is able to follow the shape of the support frames 5, as will be disclosed in further details hereinafter.

The carriage 18 subdivides the apparatus 1 into a storage part 24 and an idle part 25.

The storage part 24 of the apparatus 1 extends between a fixed proximal end 26, located on the side of the delivery and receiving stations, and a movable end formed by a first wheel 19 of the carriage 18, hereinafter referred to as a transfer wheel.

The idle part 25 of the apparatus 1 symmetrically extends between a fixed distal end 27, opposite to the proximal end 26, and a movable end formed by the other wheel 20 of the carriage 18, hereinafter referred to as an idle wheel.

The drive members 3, 4 are motor-driven separately, so that the infeed drive member 3 is driven independently from the outfeed drive member 4. In the depicted embodiment, the apparatus 1 is substantially symmetrical with respect of a vertical axis located in the center of the carriage 18 between the wheels 19, 20.

The infeed drive member 3 is displaced in the infeed direction ID by an infeed drive mechanism 28 located in the storage part 24, at the proximal end 26. The infeed drive mechanism 28 comprises a drive sprocket 29 pivotally mounted on the support frame 5 and engaging the infeed drive member 3, and a variable speed drive motor (not shown) pivotally coupled to the drive sprocket 29 through a drive shaft 30. At the distal end 27, the infeed drive member 3 runs in loop on a driven reversing pulley pivotally mounted on the support frame 5. The infeed drive member 3 may be tensioned by adjusting the position of this driven pulley.

Figure 2:
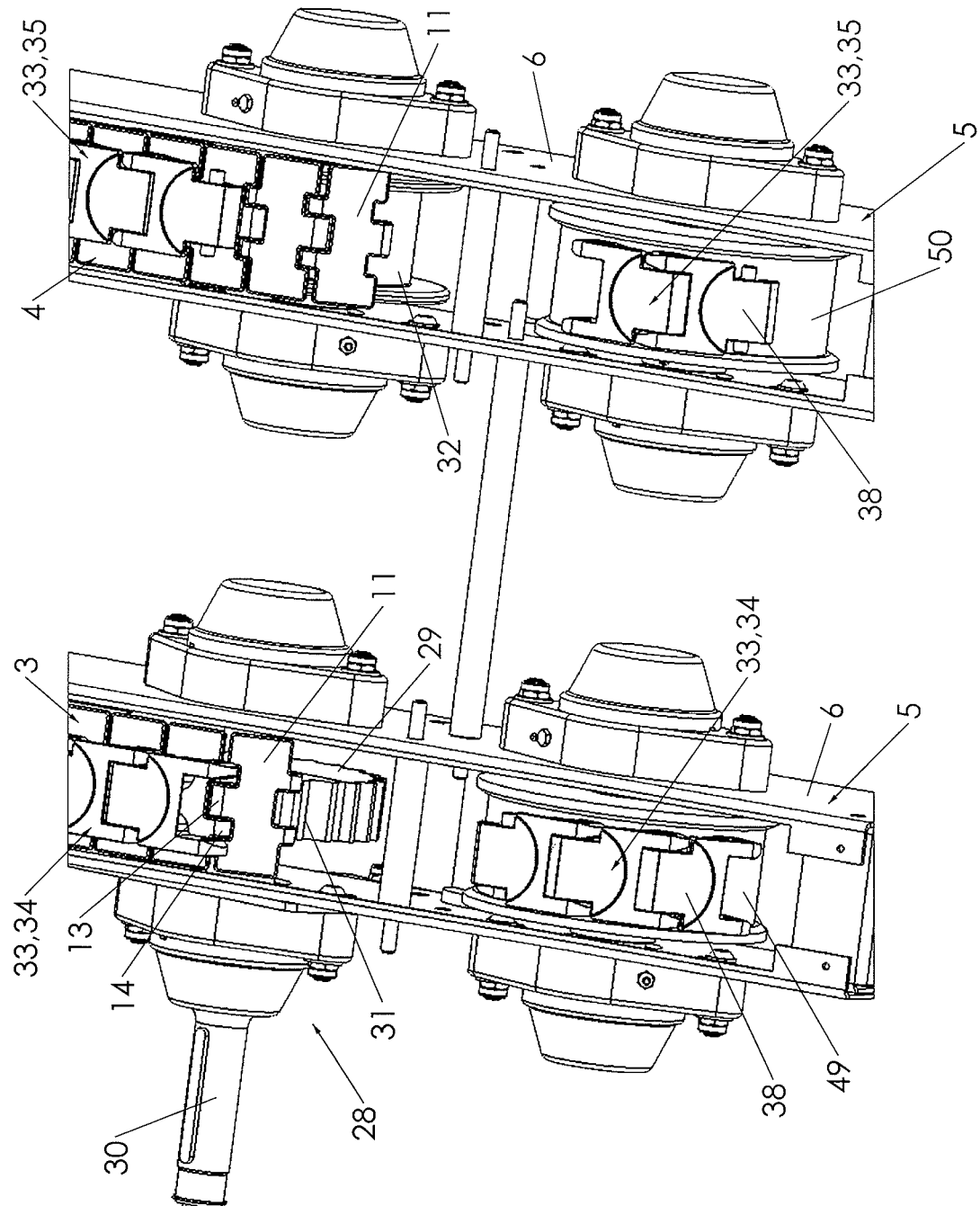
FIG. 2 is a top perspective view of a detail of the apparatus of FIG. 1. The drawing shows a drive mechanism engaging an infeed drive member, and a driven pulley engaged by an endless conveyor overlying the drive mechanism.

As depicted on FIG. 2, the drive sprocket 29 comprises a peripheral series of teeth 31 which mesh with the connecting parts 13, 14 of the links 11, whereas the links 11 simply frictionally engage the driven reversing pulley.

Symmetrically, the outfeed drive member 4 is displaced in the outfeed direction OD by an outfeed drive mechanism similar to the infeed drive mechanism 28 but located in the idle part 25 of the apparatus 1 at the distal end 27, whereas, at the proximal end 26, the outfeed drive member 4 runs in loop on a driven reversing pulley 32.

Rotational speed of the motors is controlled e.g. by a computer control unit which allows adjustment of the linear speed of the infeed and outfeed drive members 3, 4. In normal operation the drive members 3, 4 move at the same speed in opposite directions, so that there is no speed differential therebetween.

The apparatus 1 further comprises an endless carrier conveyor 33 on which the articles 2 are supported and transported from an article entry point IN, located at the proximal end 26 on the side of the upstream delivery station, where the articles 2 enter the apparatus 1, and an article exit point OUT, also located at the proximal end 26 but on the side of the downstream delivery station, where the articles 2 leave the apparatus 1.

The endless carrier conveyor 33 overlies the drive members 3, 4 and is removably attached thereto.

More precisely, on the one hand, the endless carrier conveyor 33 comprises an infeed section 34 overlying the infeed drive member 3 and removably attached thereto, running from the article entry point IN to a diverting point DIV, adjacent the periphery of the transfer wheel 19, where the carrier conveyor 33 laterally disconnects from the infeed drive member 3.

On the other hand, the endless carrier conveyor 33 comprises an outfeed section 35 overlying the outfeed drive member 4 and removably attached thereto, running from an inverting point INV, adjacent the transfer wheel 19 and diametrically opposite to the diverting point DIV, where the carrier conveyor 33 laterally connects the outfeed drive member 4, to the article exit point OUT.

The carrier conveyor 33 is not directly motor-driven. The infeed section 34 of the endless carrier conveyor 33 is driven in the infeed direction ID by the infeed drive member 3, whereas the outfeed section 35 is driven in the outfeed direction OD by the outfeed drive member 4.

Figure 3:
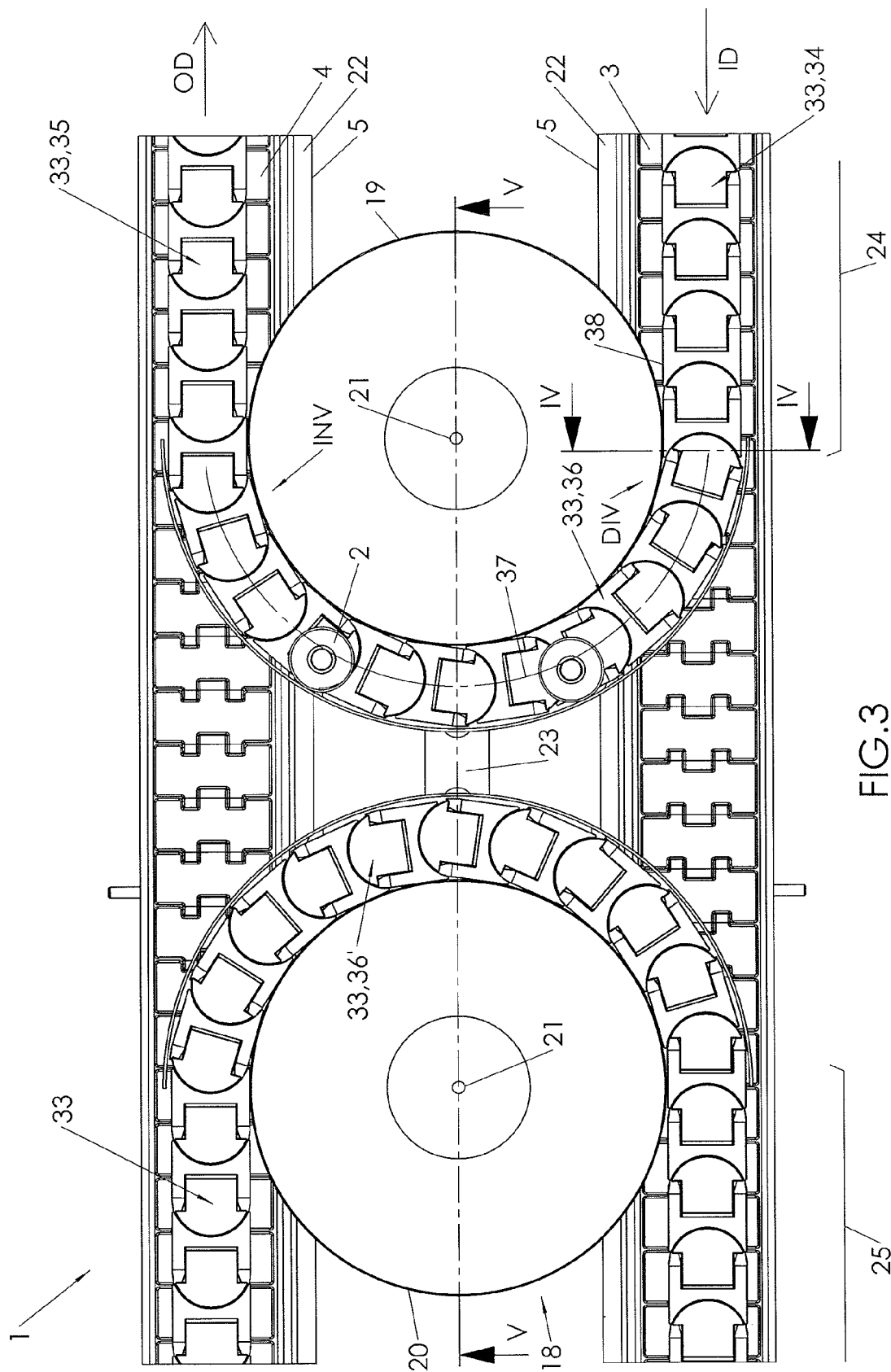
FIG. 3 is a top plan view of a detail of the apparatus of FIG. 1. The drawing shows an infeed drive member and an outfeed drive member, a movable carriage including a transfer wheel mounted between the drive members, and an endless conveyor overlying the drive members and including an intermediate arcuate section engaging the transfer wheel.

As depicted on FIG. 1 and FIG. 3, the endless carrier conveyor 33 comprises an arcuate intermediate section 36 bridging the infeed section 34 and the outfeed section 35. The intermediate arcuate section 36 forms a loop along a semicircular transfer path 37 around the periphery of the transfer wheel 19, between the diverting point DIV and the inverting point INV.

The transfer wheel 19 is frictionally drivingly engaged on its circumference by the intermediate section 36 of the endless carrier conveyor 33 which is tangent to the transfer wheel 19 and causes the latter to rotate around its central axis 21. In other words, the transfer wheel 19 acts as a driven reversing pulley deflecting the carrier conveyor 33 from the infeed drive member 3 to the outfeed drive member 4.

Symmetrically, the idle wheel 20 is frictionally engaged on its circumference by an intermediate section 36' of the portion of the carrier conveyor 33 located in the idle part 25 of the apparatus 1, in a direction opposite to the transfer wheel 19.

Figure 7:
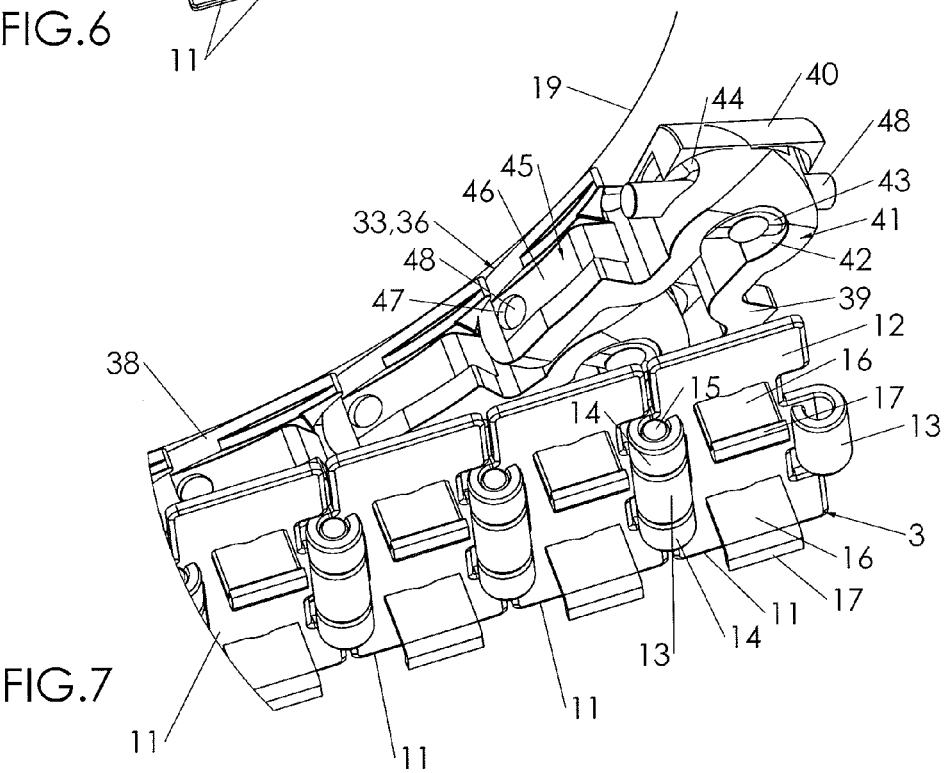
FIG. 7 is a bottom perspective view of the drive member and endless conveyor of FIG. 6.

The carrier conveyor 33 is and endless chain belt comprising a plurality of hinged connecting links 38. Each link 38 comprises a body 39 and a head 40 pivotally mounted on the body 39 around a vertical axis. More specifically, the body 39 comprises a hollow male section 41 having a cylindrical bore 42 in which is received a cylindrical shaft 43 integrally formed on the head 40, whereby the head 40 is capable of rotating around the shaft 43 with respect of the body 39. As depicted on FIG. 7, the male section 41 is also provided with a pair of lateral elongated windows 44.

The body 39 further comprises a female section 45 having a pair of longitudinally protruding flanges 46 receiving a male section 41 of an adjacent link 38. Each flange 46 is provided with a through hole 47. Attachment of two adjacent links 38 is achieved by means of a connecting pin 48 inserted both in the through holes 47 and the lateral windows 44 across the shaft 43 of the head 40, whereby the links 38 are hingedly attached to one another around the connecting pin 48, which also serves to fix the head 40 to the body 39 with angular displacement around the shaft 43.

As depicted on FIG. 2, the endless carrier conveyor 33 runs on a plurality of driven reversing pulleys 49, 50. More precisely, the infeed section 34 frictionally engages an infeed driven reversing pulley 49 mounted to the support frame 5 at the proximal end 26 on the side of the upstream delivery station, parallel and adjacent to the drive sprocket 29 of the infeed drive mechanism 28. Symmetrically, the outfeed section 35 frictionally engages an outfeed driven reversing pulley 50 mounted to the support frame 5 at the proximal end 26 on the side of the downstream receiving station, parallel and adjacent to the driven reversing pulley 32 of the outfeed drive member 4.

In FIG. 2 only some of the links 11, 38 of the drive members 3, 4 and carrier conveyor 33 are represented, in order to allow visual access to the drive sprocket 29 and to the reversing pulleys 49, 50.

In a preferred embodiment, the carrier conveyor 33 is magnetically attached to the infeed and outfeed drive members 3, 4.

Figure 8:
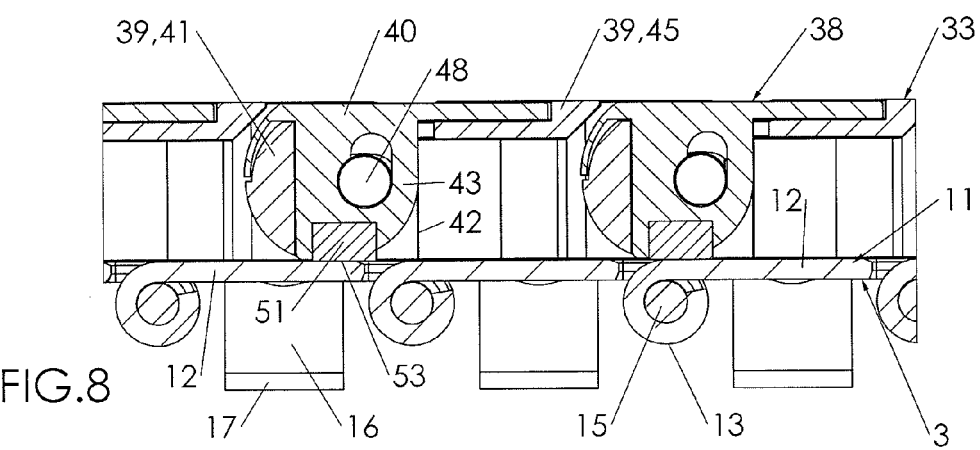
FIG. 8 is a longitudinal sectional view showing of the drive member and endless conveyor of the apparatus of FIG. 1, taken along a straight infeed section.

More specifically, as depicted on FIG. 8, each link 38 of the endless carrier conveyor 33 comprises a cylindrical permanent magnet 51 mounted in a corresponding bore 52 formed in the shaft 43 of the head 40, whereby a lower planar surface 53 of the magnet 51 slightly protrudes downwardly from the link 38.

As a result, each link 38 of the infeed section 34 is magnetically attached to an underlying ferromagnetic supporting plate 12 of a link 11 of the infeed drive member 3. Symmetrically, each link 38 of the outfeed section 35 is magnetically attached to an underlying ferromagnetic supporting plate 12 of a link 38 of the outfeed drive member 4.

In the linear infeed and outfeed sections 34, 35, the overall attachment force of the carrier conveyor 33 to the underlying infeed and outfeed drive members 3, 4 is equal to the sum of the individual magnetic attachment forces of each magnet 51 to the underlying supporting plate 12. Therefore, vertical or horizontal manual tear-off of the carrier conveyor 33 as a whole, from the underlying drive members 3, 4, is quite difficult. The longer the infeed and outfeed sections 34, 35, the stronger the attachment of the carrier conveyor 33 to the drive members 3, 4. Dimensional and material provisions may vary according to the use of the apparatus 1. Ordinary magnets 51 can provide an individual attachment force to a stainless ferritic surface of more than $0.3$ $N/cm^2$, so that a magnet having a diameter of 2 cm is able to provide a magnetic attachment force of about 10 N.

However, one advantage of such a magnetic attachment is that is permits an easy progressive disconnection of the carrier conveyor 33 from the underlying drive member 3, 4, either vertically or horizontally.

At the level of the infeed drive mechanism 28, the drive sprocket 29 meshes with the links 11 of the infeed drive member 3 which is thereby forced vertically down. As the carrier conveyor 33 remains horizontal under the longitudinal tension exerted by the driven reversing pulley 49, the infeed drive member 3 is disconnected link by link from the overlying infeed section 34 of the carrier conveyor 33. Similarly, the driven reversing pulley 32, around which the outfeed drive member 4 is winded, forces the outfeed drive member 4 to disconnect link by link from the underlying outfeed section 34 of the carrier conveyor 33, which remains horizontal under the longitudinal tension exerted by its own driven reversing pulley 50.

At the diverting point DIV, where the carrier conveyor 33 winds around the transfer wheel 19, the conveyor 33 is laterally forced out of the underlying infeed drive member 3, whereby the links 38 of the carrier conveyor 33 progressively slide out laterally from the underlying links 11 until they separate therefrom when the permanent magnet 51 leaves the supporting plate 12.

As long as there is no speed difference between the drive members 3, 4 moving in opposite directions, the carrier conveyor 33 only exerts a peripheral frictional effort on the transfer and idle wheels 19, 20, whereby the carriage 18 remains still with respect of the support frames 5.

On the contrary, as soon as there exists a speed difference between the infeed and outfeed drive members 3, 4, the carriage 18 slidingly travels on the rails 22 in the direction of the faster drive member 3 or 4.

Such a situation occurs when the buffer area capacity has to be set according to a difference of speed rate between the upstream delivery station and the downstream receiving station.

Whenever the speed rate of the upstream delivery station is greater than the speed rate of the downstream receiving station, more articles 2 need to be accumulated in the buffer area, which therefore has to be enlarged. In order to do so, the linear speed of the outfeed drive member 4 is lowered with respect of the linear speed of the infeed drive member 3, whereby there appears a negative speed differential between the outfeed section 35 of the carrier conveyor 33, which runs at the same speed as the underlying outfeed drive member 4, and the infeed section 34 of the carrier conveyor 33, which runs at the same speed as the underlying infeed drive member 3. As a result, the carrier conveyor 33 exerts on the idle wheel 20, through its corresponding intermediate section 36', a tension directed longitudinally towards the distal end 27 of the apparatus 1, whereby the carriage 18 is slidingly displaced between the support frames 5 towards the distal end 27.

On the contrary, whenever the speed rate of the upstream delivery station is lower than the speed rate of the downstream receiving station, less articles 2 need to be accumulated in the buffer area, which therefore has to be reduced. In order to do so, the linear speed of the infeed drive member 3 is increased with respect of the linear speed of the outfeed drive member 4, whereby there appears a positive speed differential between the outfeed section 35 and the infeed section 34 of the carrier conveyor 33. As a result, the carrier conveyor 33 exerts on the transfer wheel 19, through its intermediate section 36, a tension directed longitudinally towards the proximal end 26 of the apparatus 1, whereby the carriage 18 is slidingly displaced between the support frames 5 towards the proximal end 26.

In order to support the intermediate section 36 of the carrier conveyor 33 along the transfer path 37, the carriage 18 is provided with a dead plate 54 mounted on the connecting rod 23 adjacent to the transfer wheel 19 and extending between the infeed and outfeed drive members 3, 4, whereby the endless carrier conveyor 33 rides on the dead plate 54 in the intermediate section 36 and is prevented from slipping downwards out of the periphery of the transfer wheel 19 under the weight of the articles 2.

In addition, in order to prevent the articles 2 from slipping radially or even falling out of the intermediate section 36 under inertial forces, the carriage 18 comprises an arcuate guide member 55 extending outwardly along and adjacent the intermediate section 36. In the illustrated embodiment, the guide member 55 is formed of a semi-circular metallic plate fixed to the dead plate 54 and extending above the infeed and outfeed drive members 3, 4 up to an outer edge thereof, in order to accompany the articles all along the transfer path 37.

The invention claimed is:

1. An apparatus for handling articles, comprising:
   an endless infeed drive member in the form of a chain or belt moving along a longitudinal path and configured to move in an infeed direction;
   an endless outfeed drive member in the form of the chain or belt moving along the longitudinal path, spaced apart from the infeed drive member and configured to move in an outfeed direction opposite to the infeed direction;
   an endless carrier conveyor comprising:
   an infeed section overlying the infeed drive member and removably attached thereto, whereby said infeed drive member is configured to drive said infeed section in the infeed direction;
   an outfeed section overlying the outfeed drive member and removably attached thereto, whereby said outfeed drive member is configured to drive said outfeed section in the outfeed direction;
   an arcuate intermediate section bridging the infeed section and the outfeed section along a transfer path between a diverting point where the carrier conveyor disconnects from the infeed drive member, and an inverting point where the carrier conveyor connects with the outfeed drive member.

2. The apparatus according to claim 1, wherein said endless carrier conveyor is magnetically attached to the infeed drive member and to the outfeed drive member.

3. The apparatus according to claim 1, wherein the infeed drive member, the outfeed drive member and the carrier conveyor are endless chain belts, each of the endless chain belts including comprising a plurality of connecting links.

4. The apparatus according to claim 3, wherein each connecting link of the infeed and outfeed drive members comprises a supporting plate made of a ferromagnetic metal.

5. The apparatus according to claim 4, wherein each connecting link of the carrier conveyor comprises a permanent magnet which, in the infeed section, is magnetically attached to the supporting plate of a connecting link of the infeed drive member and which, in the outfeed section, is magnetically attached to the supporting plate of a connecting link of the outfeed drive member.

6. The apparatus according to claim 1, further comprising a carriage comprising a transfer wheel pivotally mounted between the infeed and outfeed drive members and drivingly engaged on a circumference of the transfer wheel by the endless carrier conveyor which causes the transfer wheel to rotate around a central axis,
   wherein said carriage is configured to remain still when there is no speed difference between the infeed and outfeed drive members, and
   when there is a speed difference between the infeed and outfeed drive members, the carriage is configured to travel in the direction of the faster of the infeed and outfeed drive members.

7. The apparatus according to claim 6, wherein the arcuate intermediate section of the carrier conveyor is tangent to and is configured to frictionally engage the transfer wheel.

8. The apparatus according to claim 6, wherein said carriage further comprises a dead plate mounted adjacent to the transfer wheel and extending between the infeed and outfeed drive members, whereby the carrier conveyor is configured to ride on the dead plate in the intermediate section.

9. The apparatus according to claim 5, wherein the carriage further comprises an arcuate guide member extending outwardly along and adjacent the intermediate section of the carrier conveyor.

10. The apparatus according to claim 1, comprising:
    a drive mechanism configured to displace each drive member, said drive mechanism comprising a drive sprocket engaging the drive member and a variable speed drive motor pivotally coupled to the drive sprocket,
    a driven pulley engaged by the carrier conveyor, mounted parallel and adjacent to the drive sprocket.

11. The apparatus according to claim 1, wherein the endless carrier conveyor comprises one continuous endless chain belt comprising the infeed, outfeed and arcuate intermediate sections.

12. The apparatus according to claim 1 further comprising a carriage comprising a transfer wheel having a disc shape and pivotally mounted between the infeed and outfeed drive members,
    wherein a diameter of the transfer wheel is substantially equal to a distance between the infeed and outfeed sections of the endless carrier conveyor.

13. The apparatus according to claim 12, wherein the arcuate intermediate section of the endless carrier conveyor is configured to frictionally engage a circumference of the transfer wheel.

14. An apparatus for handling articles, comprising:
    an endless infeed drive member in the form of a chain or belt moving along a longitudinal path and configured to move in an infeed direction;
    an endless outfeed drive member in the form of the chain or belt moving along the longitudinal path, spaced apart from the infeed drive member and configured to move in an outfeed direction opposite to the infeed direction;
    an endless carrier conveyor overlying and removably attached to the infeed drive member and the outfeed drive member, the endless carrier configured to convey the articles in a first direction along an infeed section of the endless carrier conveyor, in a second direction opposite the first direction along an outfeed section of the endless carrier conveyor and along an arcuate intermediate section of the endless carrier conveyor bridging the infeed section and the outfeed section defining a transfer path between a diverting point where the endless carrier conveyor disconnects from the infeed drive member and an inverting point where the endless carrier conveyor connects with the outfeed drive member.

* * * * *